US008121661B2

(12) United States Patent
Kristensson et al.

(10) Patent No.: US 8,121,661 B2
(45) Date of Patent: Feb. 21, 2012

(54) MECHANISM FOR RADIO COMMUNICATION TERMINAL

(75) Inventors: Daniel Kristensson, Saxtorp (SE); Josef Yasir Yousefi, Oxie (SE); Henrik Martensson, Lund (SE); Magnus Mattsson, Malmo (SE); William Tolbert, Malmo (SE); Magnus Steijner, Loddekopinge (SE)

(73) Assignee: Sony Ericsson Mobile Communications AB, Lund (SE)

( * ) Notice: Subject to any disclaimer, the term of this patent is extended or adjusted under 35 U.S.C. 154(b) by 407 days.

(21) Appl. No.: 12/396,634

(22) Filed: Mar. 3, 2009

(65) Prior Publication Data

US 2010/0227656 A1 Sep. 9, 2010

(51) Int. Cl.
*H04M 1/00* (2006.01)

(52) U.S. Cl. .................. 455/575.4; 455/575.1; 455/90.3

(58) Field of Classification Search .................. None
See application file for complete search history.

(56) References Cited

U.S. PATENT DOCUMENTS

| 7,636,437 | B2 * | 12/2009 | Gronroos et al. ......... 379/428.02 |
| 2006/0017700 | A1 * | 1/2006 | Kemppinen ................. 345/169 |
| 2006/0068859 | A1 | 3/2006 | Lee et al. |
| 2007/0155447 | A1 | 7/2007 | Gordecki |

FOREIGN PATENT DOCUMENTS

| EP | 1 150 476 A2 | 10/2001 |
| EP | 1150476 A2 * | 10/2001 |
| JP | 2008 079292 | 4/2008 |
| WO | 02/063789 A1 | 8/2002 |

OTHER PUBLICATIONS

International Search Report, corresponding to PCT/EP2009/057829, mailing date of Oct. 30, 2009.
Written Opinion, corresponding to PCT/EP2009/057829, mailing date of Oct. 30, 2009.

* cited by examiner

*Primary Examiner* — Anh Tran (74) *Attorney, Agent, or Firm* — Renner, Otto, Boisselle & Sklar, LLP (57) ABSTRACT

The present invention relates to a radio communication terminal comprising a first casing, a second casing, a slider mechanism and a hinge mechanism, wherein the slider mechanism is adapted to movably connect the first and the second casing, the hinge mechanism is connected to the first and the second casing and adapted to move the first casing in relation to the second casing in at least a first direction between at least an open and a closed position, and the hinge mechanism is adapted to operate in a first space that is expanded when the first casing is moved in relation to the second casing.

17 Claims, 6 Drawing Sheets

MECHANISM FOR RADIO COMMUNICATION TERMINAL

TECHNICAL FIELD

The present invention involves a radio communication terminal comprising a first casing, a second casing, a slider mechanism and a hinge mechanism.

BACKGROUND ART

The first commercially attractive cellular phones or terminals were introduced in the market at the end of the 1980's. Since then, a lot of effort has been made in making smaller radio communication terminals, with much help from the miniaturisation of electronic components and the development of more efficient batteries. Today, numerous manufacturers offer pocket-sized radio communication terminals with a wide variety of capabilities and services.

In order to attract customers the terminal manufacturers have therefore taken further measures to strengthen their position in the competition. Size and cost is getting more and more essential in mobile handsets design. The marked trend is that mobile handsets are getting thinner.

Another market trend is that the shell of the mobile handset is divided into an upper and lower casing. The upper casing is connected to and movable in relation to the lower casing via a slider mechanism.

The slider mechanism comprises a slider that is slideable connected to a base. The slider is connected to the upper casing and the base is connected to the lower casing. A spring member is in one end connected to the slider and in the other end connected to the base. When the mobile handset is arranged in its closed position, the spring member presses the slider away from the base and locks the upper casing on top of the lower casing. To arrange the mobile handset in its open position, the upper casing is slideable moved in relation to the lower casing. The slider is moved towards the base and the spring member is compressed and rotated around its connection to the base. As the upper casing is moved further, the first end of the spring member has been moved passed the second end of the spring member. The spring member is now able to expand and to press the slider away from the base in an opposite direction compared to the closed position. The mobile handset is now arranged in its open position.

One known problem with prior art is that the slider mechanism takes up a lot of space as it is moved between the open and closed position.

Another problem is that the slider mechanism increases the thickness of the radio communication terminal.

A further problem is that the miniaturisation of the parts of the slider mechanism is expensive.

SUMMARY OF THE INVENTION

A radio communication terminal defined in claim 1 is provided according to the present invention.

More specifically the invention relates to a radio communication terminal comprising a first casing, a second casing, a slider mechanism and a hinge mechanism, wherein the slider mechanism is adapted to movably connect the first and the second casing, the hinge mechanism is connected to the first and the second casing and adapted to move the first casing in relation to the second casing in at least a first direction between at least an open and a closed position, and the hinge mechanism is adapted to operate in a first space that is expanded when the first casing is moved in relation to the second casing.

An advantage of a radio communication terminal according to the above is that the thickness of the terminal can be reduced.

A further advantage is that the size of the first space that the hinge mechanism operates in is expanded, the radio communication terminal thus not have to allocate space in its closed position in which the hinge mechanism should operate in.

Another advantage is that the components of the hinge mechanism could be made more robust without affecting the thickness of the radio communication terminal.

A further advantage is that the complexity and the miniaturization of the hinge mechanism could be reduced.

A first end of the hinge mechanism can be connected to a first surface of the first casing and a second end of the hinge mechanism can be connected to a first surface on the second casing and wherein said first surfaces could extend in at least a second direction, and the second direction is different than the first direction.

An advantage of this is that the first space is achieved in an effective and space efficient manner.

To even further increase the expansion of the first space, the second direction can be substantial perpendicular to the first direction.

The radio communication terminal can further comprise at least one flexible circuit that is electronically and/or optically connected to the first and the second casing, wherein the flexible circuit is adapted to be moved in said first space.

An advantage of this is that the risk of that the flexible circuit is damaged when it is moved when the first casing is moved in relation to the second casing is reduced.

A further advantage is that the size of the first space that the flexible circuit is moved in is increased.

The thickness of the radio communication terminal can be less than the sum of the thickness of the first casing and the second casing.

The thickness of the hinge mechanism can be smaller than the thickness of said first space.

The extension of the hinge mechanism in the thickness of the radio communication terminal can be less than the extension of the first surfaces in the thickness of the radio communication terminal.

The said first space can be expanded by expansion in the first direction.

The said first space can in two dimensions be defined by said first surfaces.

To obtain the advantage of that the first and the second casings are stable in both the open and closed position, the hinge mechanism can be bi-stable.

The hinge mechanism can comprises a bar and a spring mechanism, the spring mechanism can be connected to the first casing, the bar can in a first end be connected to the spring mechanism and in a second end be connected to the second casing, and the spring mechanism can be adapted to turn the bar and thereby move the first and the second casing between the open and closed positions.

An advantage with the above hinge mechanism is that it is space and cost efficient. A further advantage is that it does not add to the thickness of the radio communication terminal.

A further advantage is that the hinge mechanism could achieve a large stroke, i.e. the distance that the first casing could be moved in relation to the second casing.

An efficient and solid way to connect the bar to the second casing can be that the second end of the bar can be slideably connected to the second casing.

The second casing can comprise a groove, the hinge mechanism can further comprises a slider that is slideably arranged in the grove, and the second end of the bar is connected to the slider.

Said groove can be arranged in the first surface of the second casing.

The bar can comprise a slit along its length, the second casing can comprise a pin that is slideably arranged in said slit. An advantage of this is that it is a efficient and solid way to connect the bar to the second casing.

The spring mechanism can further comprise a cam, a cam follower and a pressure spring, and the pressure spring can be adapted to cooperate with the cam and the cam follower to turn the cam follower in relation to the cam.

An advantage of this spring mechanism is that it is space efficient. A further advantage is that it could obtain relatively strong force that is exerted on the bar. A further advantage is that the spring mechanism does not add to the thickness of the radio communication terminal.

The hinge mechanism can comprise at least a first and a second bar and a spring mechanism, the spring mechanism can be connected to the first casing, the first bar can in a first end be connected to the spring mechanism and in a second end be connected to a first end of the second bar, the second bar can in a second end be turnable connected to the second casing, and the spring mechanism can be adapted to turn the first and the second bars and thereby move the first and the second casing between the open and closed positions.

An advantage with the above hinge mechanism is that it is space and cost efficient. A further advantage is that it does not add to the thickness of the radio communication terminal.

A further advantage is that the hinge mechanism could achieve a large stroke.

The spring mechanism can further comprise a cam, a cam follower and a pressure spring, the pressure spring can be adapted to cooperate with the cam and the cam follower to turn the cam follower in relation to the cam.

The hinge mechanism can comprise a first and a second element and the spring mechanism can comprise pressure springs, the spring mechanism is connected to the first and second element and adapted to press the said elements apart, the first element is rotatable connected to the first casing, and the second element is rotatable connected to the second casing.

An advantage of this spring mechanism is that it is space and cost efficient. A further advantage is that it could obtain relatively strong forces. A further advantage is that the spring mechanism does not add to the thickness of the radio communication terminal.

A further advantage is that the size of the spring does not add to the thickness of the radio communication terminal and the need of costly miniaturization could be eliminated.

BRIEF DESCRIPTION OF THE DRAWINGS

The features and advantages of the present invention will be more apparent from the following description of embodiments with reference to the accompanying drawings, in which.

DETAILED DESCRIPTION

The present description relates to the field of radio communication terminals. The term radio communication terminal or communication terminal includes all mobile equipment devised for radio communication with a radio station, which radio station also may be mobile terminal or e.g. a stationary base station. Consequently, the term radio terminal includes mobile telephones, pagers, communicators, electronic organisers, smart phones, PDA:s (Personal Digital Assistants) and DECT terminals (Digital Enhanced Cordless Telephony).

Embodiments of the present invention relate, in general, to a radio communication terminal, such as a mobile phone. However, for the sake of clarity and simplicity, most embodiments outlined in this specification are related to mobile phones.

In the following description reference is made to the accompanying drawings. In this regard directional terminology, such as "top", "bottom", "front", "length", "thickness", width", "back" etc., is used with reference to the orientation of the figures being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present protection. The following detailed description is not to be taken in a limiting sense, and the scope of the present invention is defined by the appended claims.

Furthermore, it should be emphasised that the term comprising or comprises, when used in this description and in the appended claims to indicate included features, elements or steps, is in no way to be interpreted as excluding the presence of other features elements or steps than those expressly stated.

Figure 1:
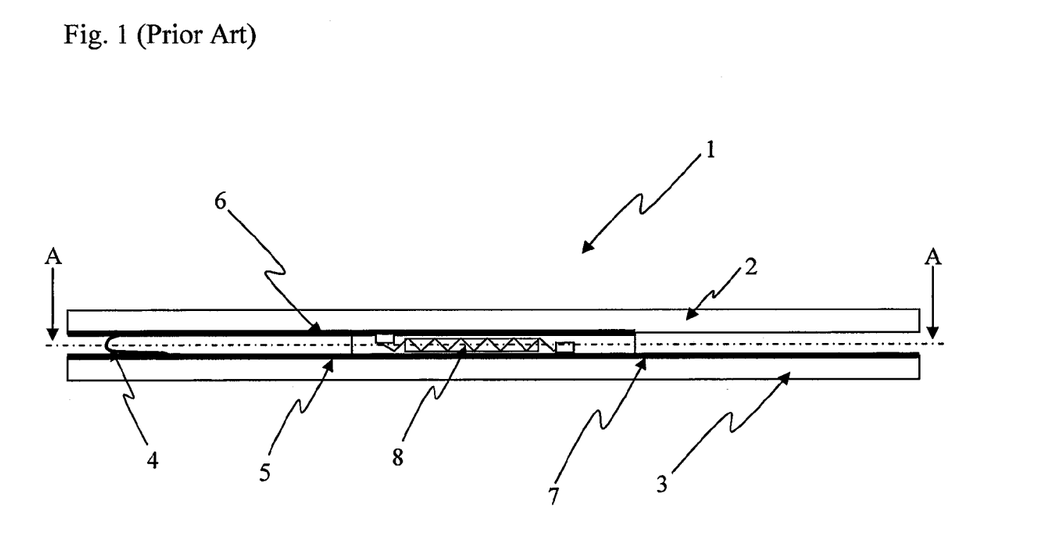
FIG. 1 schematically illustrates a cross section of a radio communication terminal according to prior art.
Figure 2:
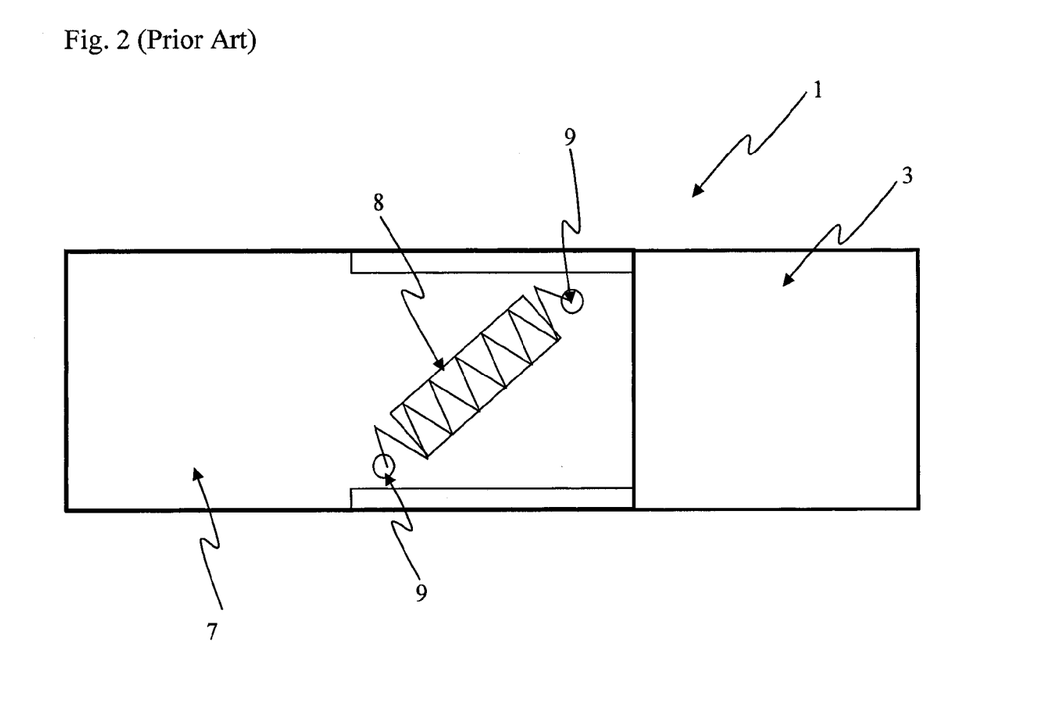
FIG. 2 schematically illustrates cross sectional view along the line A-A in FIG. 1 of a radio communication terminal according to prior art FIG. 3 schematically illustrates a cross sectional view of an embodiment according to the invention in a closed position.

FIGS. 1 and 2 discloses a radio communication terminal 1 according to prior art and comprise a first casing 2, a second casing 3, a communication device 4 and a slider mechanism 5.

The first casing 2 and the second casing 3 could comprise a keypad, a display, a microphone, a speaker and a camera (not disclosed). These devices are known and disclosed in prior art and will thus not be described in this application. The devices in the first casing 2 could communicate with the devices in the second casing via a flexible circuit in the communication device 4.

The slider mechanism 5 comprises a slider 6, a base 7 and a spring 8. The spring 8 is in one end 9 rotatable connected to the slider 6 and in the other end 9 rotatable connected to the base 7. The base 7 comprise a groove (not disclosed) in which the slider 6 is slideable arranged in.

The slider 6 is mounted on the first casing 2 and the base 7 is mounted on the second casing 3. The first casing 2 is slideable movable in relation to the second casing 3 between a closed position and an open position. The radio communication terminal 1 disclosed in FIG. 1 is in the closed position. To move the radio communication terminal 1 from its closed to its opened position the first casing 2 is moved in relation to the second casing 3. As the first casing 2 is moved, the slider 6 is moved together with it. The slider 6 is moved in a direction such that the ends 9 of the spring 8 are moved towards each other and the spring 8 is compressed. When the slider 6 is moved further, the ends 9 of the spring 8 are moved passed each other. The spring 8 is now able to flex back and expand. As it expands it moves the first casing 2 in relation to the second casing 3 to the opened position. During this movement the slider 6 slides in the groove of the base 7.

The spring 8 is moved for a relatively long distance between the first and the second casings 2, 3. The spring 8 takes up nearly the whole width of the said casings 2, 3.

The thickness of the radio communication terminal is the sum of the thickness of the first casing, the second casing, the slider, the spring and play between the moving parts.

Exemplary embodiments of the invention will now be described with references made to the FIGS. 3-8

Figure 3:
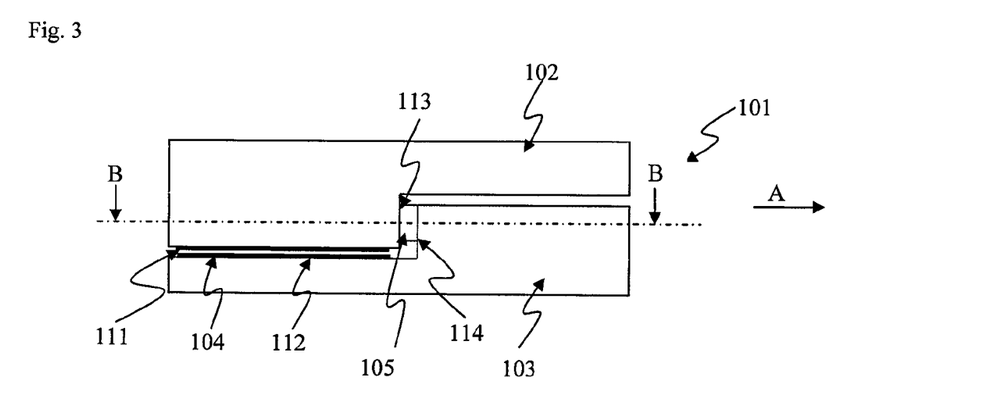
Figure 4:
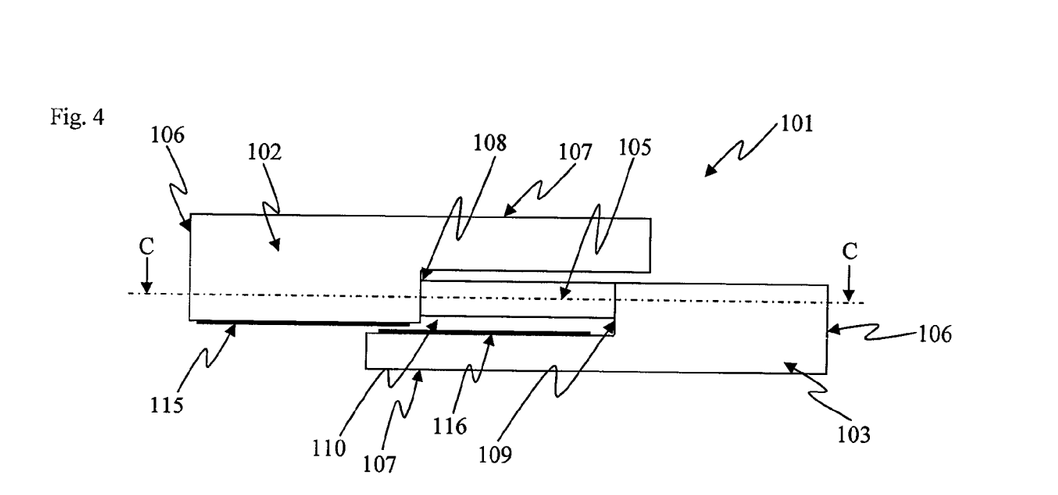
FIG. 4 schematically illustrates a cross sectional view of the embodiment according to the invention in FIG. 3 in an open position.

FIGS. 3 and 4 disclose an embodiment of a radio communication terminal 101 according to the invention. The radio communication terminal 101 comprises a first casing 102, a second casing 103, a sliding mechanism 104 and a hinge mechanism 105.

The first casing 102 and the second casing 103 could comprise a keypad, a display, a microphone, a speaker and a camera (not disclosed). These devices are known and disclosed in prior art and will thus not be described in detail in this application.

The first casing 102 and the second casing 103 has an L-shape in its cross section. A base 106 of the L-shape extend in the thickness of the radio communication terminal. A back 107 of the L-shape extend in the length of the radio communication terminal 101. The shape of the first and the second casings 102, 103 can vary along the width of the radio communication terminal 101.

A first surface 108 of the base 106 of the first casing 102 is directed towards a first surface 109 of the base 106 of the second casing 103. The first surfaces 108, 109 are located at a distance from each other such that a first space 110 is located between them. In the shown embodiment, the first surfaces 108, 109 extend in a second direction. The second direction extends in at least one of the directions of the width and the thickness of the radio communication terminal 101.

The first casing 102 is arranged on top of the second casing 103 such that an end 111 of the base 106 of the first casing 102 faces a second surface 112 of the back 107 of the second casing 103 and a second surface 112 of the back 106 of the first casing 102 faces a end 111 of the base 106 of the second casing 103.

The hinge mechanism 105 is arranged in the first space 110 between the first surfaces 108, 109 of the first and the second casing 102, 103. The hinge mechanism 105 is in a first end 113 connected to the first surface 108 of the first casing 102 and in a second end 114 connected to the first surface 109 of the second casing 103. The hinge mechanism 105 comprises a spring (not disclosed in FIGS. 3 and 4).

The slider mechanism 104 comprises a base element 115 and a slider element 116. The base element 115 is mounted on the end 111 of the first casing 102 and the slider element 116 is mounted on the second surface 112 of the second casing 103. The slider element 116 is slideably connected to the base element 115. The slider mechanism 104 could be designed in many other ways without departing from the invention, the base element 115 and the slider element 116 could for instance be integrated in the first and the second casings 102, 103.

The second casing 103 is movable in relation to the first casing 102 between a closed position and an open position. In the closed position, see FIG. 3, the second casing 103 is arranged on top of the first casing 102. In the open position, see FIG. 4, the second casing 103 has been displaced in a first direction A in relation to the first casing 102.

To move the second casing 103 from the open position to the closed position, a user of the radio communication terminal 101 grabs the first and the second casings 102, 103. The second casing 103 and the slider element 116 are moved in relation to the base element 115 and the first casing 102 in the first direction A. As the second casing 103 is moved, the slider element 116 is slideably moved in the base element 115.

When the first casing 102 is moved in the first direction A in relation to the second casing 103, the first surfaces 108, 109 is moved away from each other. The first space 110 between the first and the second casings 108, 109 is expanded when the first and the second casings 102, 103 are moved away from each other.

The hinge mechanism 105 is moved from a first to a second position when the first and the second casings 102, 103 are moved between the open and closed position. In the closed position, the hinge mechanism 105 interacts with the first surfaces 108, 109 to keep the radio communication terminal 101 in its closed position. When the second casing 103 is moved in relation to the first casing 102, the spring is compressed and energy is stored in the spring. When the second casing 103 has been moved a predetermined distance in relation to the first casing 102, the hinge mechanism 105 interacts with the first surfaces 108, 109 and moves the second casing 103 away from the first casing 102 until the radio communication terminal 101 is arranged in its open position. The energy of the spring is utilized to move the second casing 103 in relation to the first casing 102. In the open position, the hinge mechanism 105 interacts with the first surfaces 108, 109 to keep the radio communication terminal 101 in its open position.

The hinge mechanism 105 operates in the first space 110 and as the first space 110 is expanded when the first and second casing 102, 103 are moved between the closed and open position, the available space for the hinge mechanism 105 to operate in is thus also expanded. The hinge mechanism 105 is moved in a space that is not present when the first and the second casing 102, 103 are in its closed position. As the first and second casings 102, 103 are moved and the first space 110 is expanded, it is possible for the hinge mechanism 105 to move in said first space 110.

The hinge mechanism 105 operates in a way such that it does not add to the thickness of the radio communication terminal 101. The thickness of the radio communication terminal 101 disclosed in FIGS. 3 and 4 is equal to the sum of the length of the base 106 of the first casing 102, the thickness of the back 107 of the second casing 103, the thickness of the slider mechanism 104 and the play between surfaces that are moved in relation to each other. The radio communication terminal 101 could thus be made thinner than the radio communication terminal 1 according to prior art disclosed in FIGS. 1 and 2.

The parts comprised in the hinge mechanism 105 could be made more robust, and thus also cheaper and easier to manufacture, as the hinge mechanism 105 does not add to the thickness of the radio communication terminal 101.

To once again arrange the first and second casing 102, 103 in the closed position the steps disclosed above is reversed.

The devices in the first casing 102 communicate with the devices in the second casing 101 via a flexible circuit (not disclosed in FIGS. 3 and 4). A first end of the flexible circuit is connected to the first casing 102 and a second end of the flexible circuit is connected to the second casing 103. The flexible circuit is arranged and moved in the first space 110. As the first space 110 is expanded, when the first and second casings 102, 103 are moved, the available space for the flexible circuit to move in is expanded. As the available space for the flexible circuit is increased, the risk of that the flexible circuit is damaged when it is moved is decreased. It is also possible to use two or more flexible circuits to connect the devises in the first and second casing 102, 103.

Figure 5A:
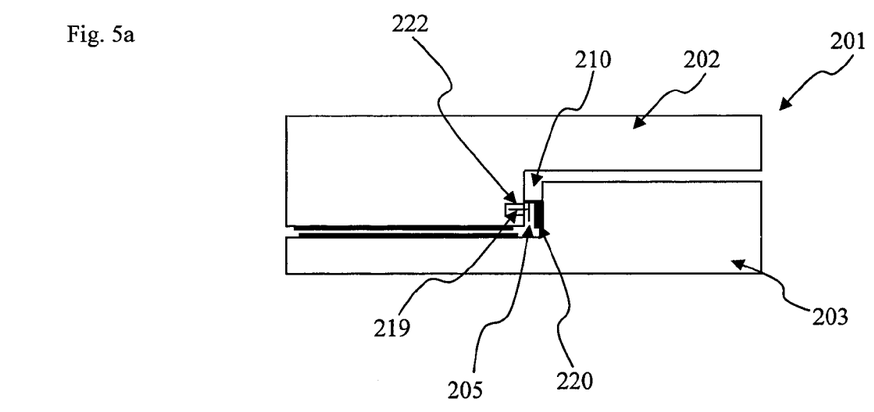
FIG. 5a schematically illustrates a cross sectional view of an embodiment of a hinge mechanism according to the invention.
Figure 5B:
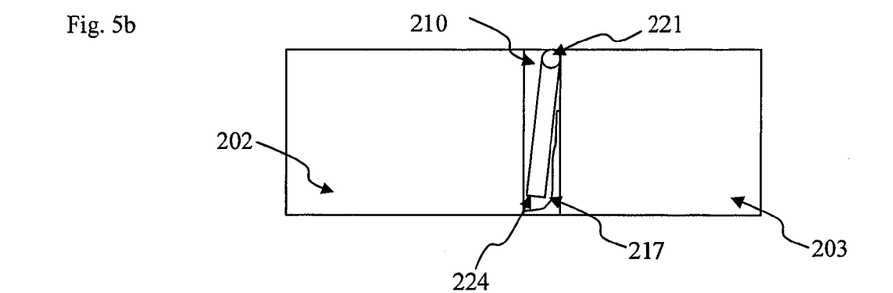
FIG. 5b schematically illustrates a cross sectional view along the line B-B in FIG. 3 of an embodiment of a hinge mechanism according to FIG. 5a in a closed position.
Figure 5C:
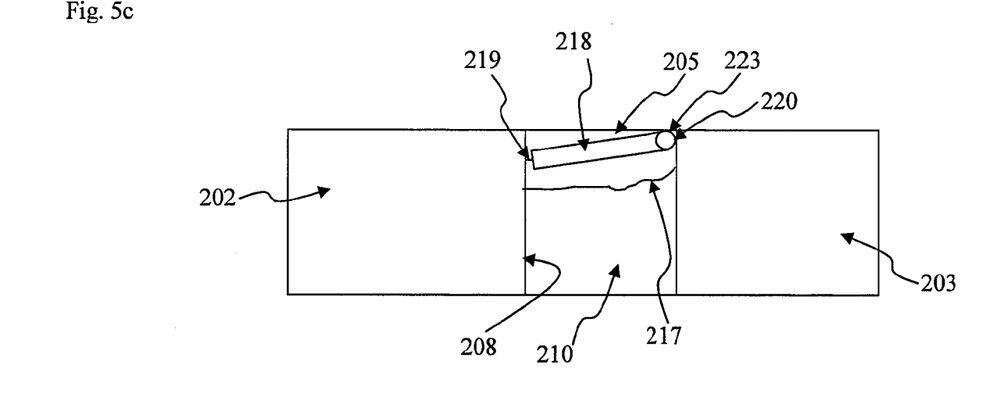
FIG. 5c schematically illustrates a cross sectional view along the line C-C in FIG. 4 of an embodiment of a hinge mechanism according to FIG. 5a in an open position.

A radio communication terminal 201 according to the invention is disclosed in FIGS. 5a-5c to which reference now is made.

The first and the second casing 202, 203 correspond to the first and the second casings 102, 103 described in connection to FIG. 3. The flexible circuit 217 corresponds to the flexible circuit described in connection to FIGS. 3 and 4.

A hinge mechanism 205 is arranged in the first space 210 and comprise a bar 218, a slider 219 and a spring mechanism 220.

The spring mechanism 220 comprises a casing 221, a cam (not shown), a cam follower (not shown) and a pressure spring (not shown). The pressure spring presses the cam follower against the cam. If the cam follower is turned in relation to the cam, the cam is moved away from the cam follower and the spring is compressed. When the cam follower is turned a predetermined angle the shape of the cam allows the pressure spring to flex back and press the cam follower against the cam and turn the cam further. After the cam follower has turned a further angle it will come to rest in a stable position. If the cam follower is turned the other way the same thing will happen. The spring mechanism 220 thus has two stable positions, i.e. the spring mechanism 220 is bi-stable.

The first surface 208 of the first casing 202 comprise a groove 222 that extends in the width of the radio communication terminal 201.

The casing 221 of the spring mechanism 220 is connected to the second casing 203. The bar 218 is in a first end 223 connected to the cam follower of the spring mechanism 220 and in a second end 224 connected to the slider 219. The slider 219 is slideably arranged in the groove 222.

When the radio communication terminal 201 is moved between the open and closed position, the first casing 202 is moved in relation to the second casing 203. In the closed position the bar 218 is extended in the width of the radio communication terminal 201.

As the first casing 202 is moved in relation to the second casing 203 the bar 218 will rotate and the slider 219 connected thereto will slide in the groove 222. When the bar 218 rotate, it also rotates the cam follower in relation to the cam. As the bar 218 has rotated the cam follower the predetermined angle in relation to the cam, the cam will rotate the cam follower and the bar 218 further until it reaches the stable position. As the first casing 202 is moved in relation to the second casing 203, the first space 210 will expand and thereby make place for the moving parts of the hinge mechanism 205. To again arrange the radio communication terminal 201 in the closed position, the steps are reversed.

The stroke of the radio communication terminal 201, i.e. the distance of which the first casing 202 could be moved in relation to the second casing 203, could be made larger in relation to prior art.

Figure 6A:
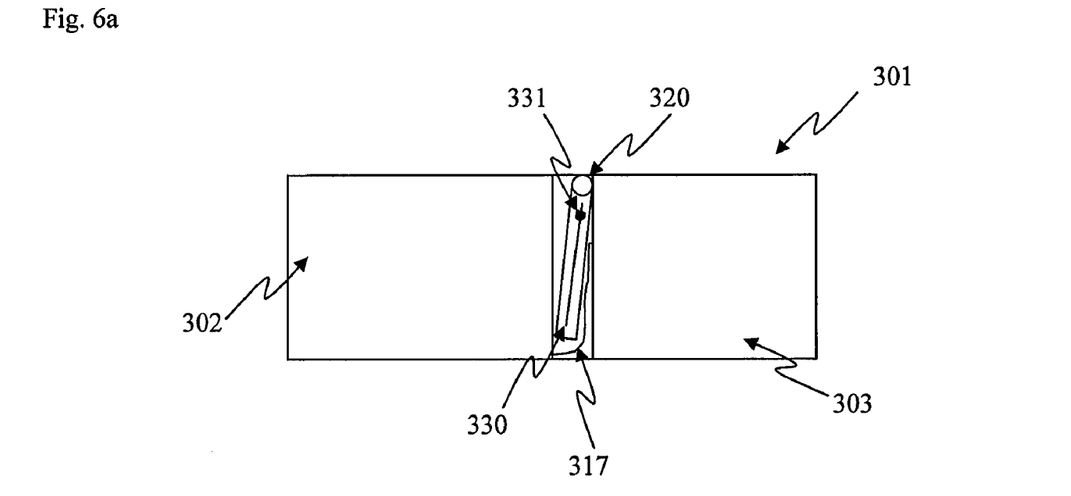
FIG. 6a schematically illustrates a cross sectional view along the line B-B in FIG. 3 of an embodiment of a hinge mechanism in a closed position.
Figure 6B:
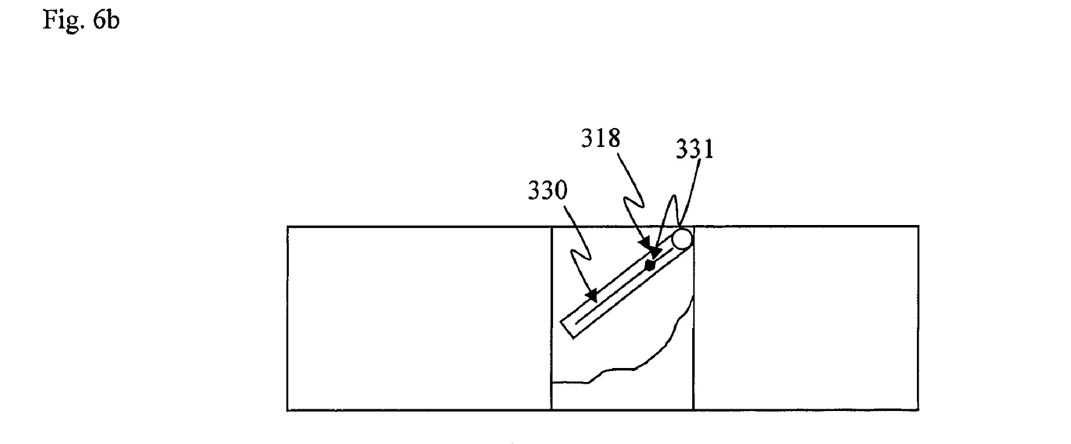
FIG. 6b schematically illustrates a cross sectional view along the line C-C in FIG. 4 of an embodiment of a hinge mechanism in an open position.

A radio communication terminal 301 according to the invention is disclosed in FIGS. 6a-6c to which reference now is made. The first and the second casing 302, 303 correspond to the first and the second casings 102, 103 described in connection to FIG. 3. The flexible circuit 317 corresponds to the flexible circuit described in connection to FIG. 3.

The radio communication terminal comprise a spring mechanism 320, a bar 318 that comprise a slit 330 along its length and the second casing 303 comprise a pin 331. The pin 331 is arranged in the slit 330. As the first casing 302 is moved in relation to the second casing 303, the bar 318 is moved and interacts with the pin 331 and the spring mechanism 320.

Figure 7A:
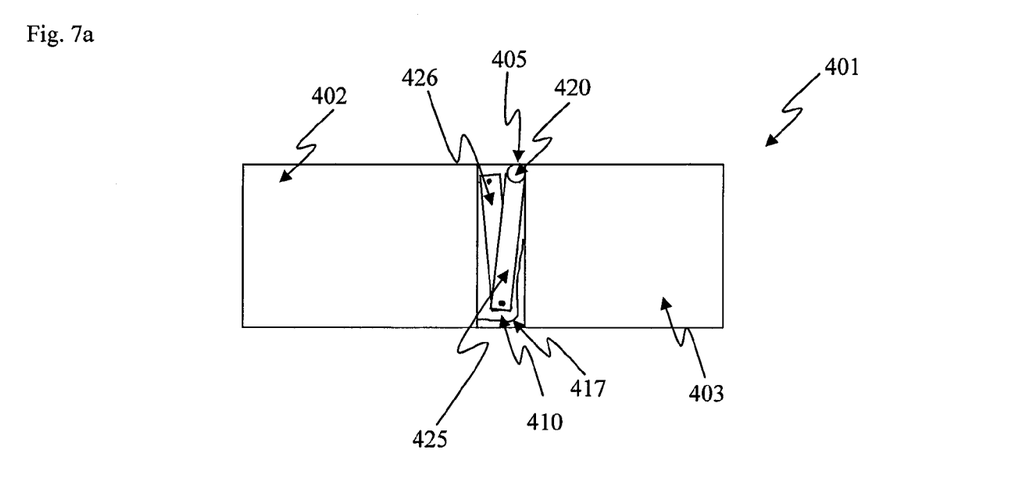
FIG. 7a schematically illustrates a cross sectional view along the line B-B in FIG. 3 of an embodiment of a hinge mechanism in a closed position.
Figure 7B:
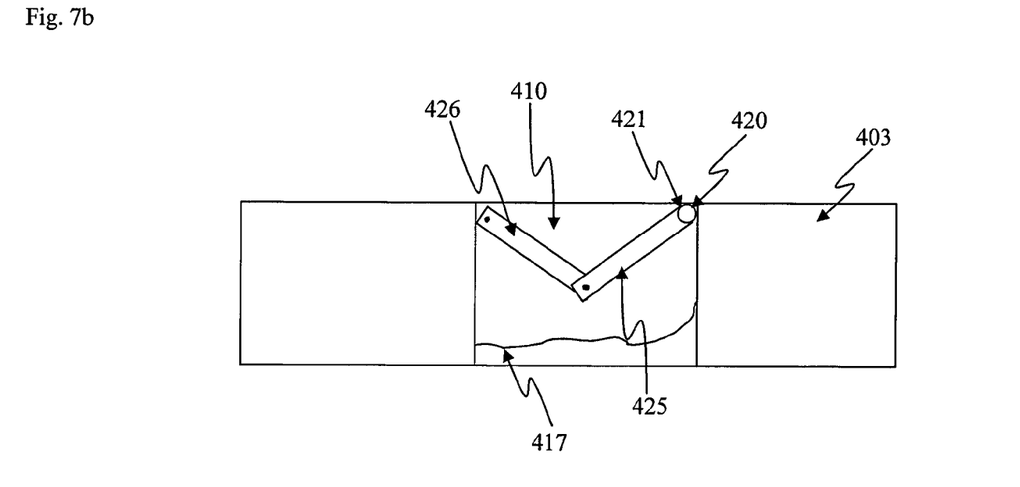
FIG. 7b schematically illustrates a cross sectional view along the line C-C in FIG. 4 of an embodiment of a hinge mechanism in an open position.

A radio communication terminal 401 according to the invention is disclosed in FIGS. 7a-7b to which reference now is made.

The first and the second casing 402, 403 correspond to the first and the second casings 102, 103 described in connection to FIG. 3. The flexible circuit 417 corresponds to the flexible circuit described in connection to FIG. 3.

A hinge mechanism 405 is arranged in a first space 410 and comprises a first bar 425, a second bar 426 and a spring mechanism 420.

The spring mechanism 420 corresponds to the spring mechanism 220 described in connection to FIG. 4.

The casing 421 of the spring mechanism 420 is connected to the second casing 403 and the cam follower is connected to a first end of the first bar 425. The second end of the first bar 425 is rotatable connected to a first end of the second bar 426. The second end of the second bar 426 is rotatable connected to the first casing 402.

When the radio communication terminal 401 is moved between the open and closed position, the first casing 402 is moved in relation to the second casing 403. In the closed position, the first and the second bar 425, 426 extend in the width of the radio communication terminal 401.

In the closed position of the radio communication terminal 401, the first bar 425 is located above the second bar 426. By this arrangement, the size of the hinge mechanism 405 is minimized in the length of the radio communication terminal 401. The thickness of the first and the second bars 425, 426 are less than the thickness of the first space 410 and will thus not add to the thickness of the radio communication terminal 401.

As the first casing 402 is moved in relation to the second casing 403, the first and the second bar 425, 426 will rotate. The first bar 425 rotates the cam follower in the same way as described above. As the cam follower has been turned a predetermined angle, the spring and the cam will cooperate and turn the cam follower further. The cam follower will turn the first and the second bars 425, 426 and the first casing 402 will be moved in relation to the second casing 403. The radio communication terminal 401 is in its open position. To again arrange the radio communication terminal 401 in the closed position, the steps are reversed.

The stroke could be made large since the stroke could equal to the length of the first and the second bar 425, 426.

Figure 8A:
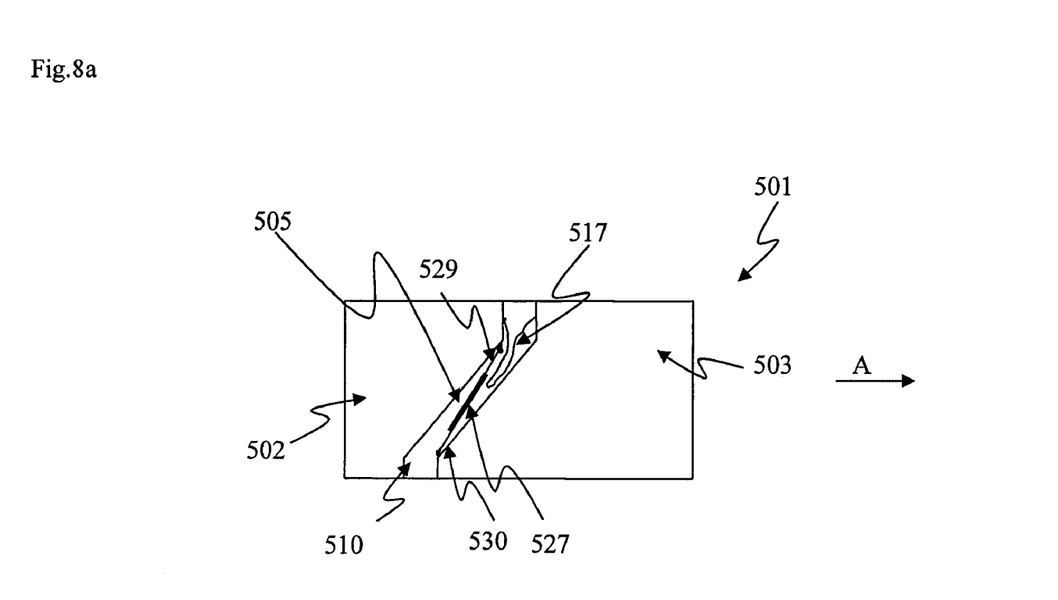
FIG. 8a schematically illustrates a cross sectional view along the line B-B in FIG. 3 of an embodiment of a hinge mechanism in a closed position.
Figure 8B:
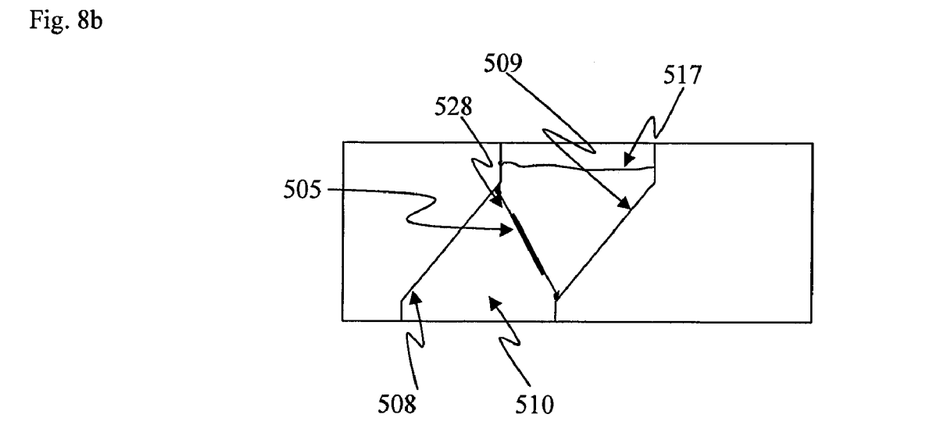
FIG. 8b schematically illustrates a cross sectional view along the line C-C in FIG. 4 of an embodiment of a hinge mechanism in an open position.

A radio communication terminal 501 according to the invention is disclosed in FIGS. 8a-8b to which reference now is made.

The flexible circuit 517 corresponds to the flexible circuit described in connection to FIG. 3.

The first surfaces 508, 509 of the first and the second casing 502, 503 extend in a 45 degree angle in relation to the first direction A.

A hinge mechanism 505 is arranged in the first space 510 and comprises a pressure spring element 527 and a frame 528, comprising a first and a second element 529, 530 that are slideably arranged to each other. The spring element 527 is connected to the first and second element 529, 530 and arranged to press the first and second elements 529, 530 apart. The first element 529 is rotatable connected to the first casing 502 and the second element 530 is rotatable connected to the second casing 503.

In the closed position of the radio communication terminal 501, the hinge mechanism 505 is located parallel to the first surfaces 508, 509 and presses the first casing 502 against the second casing 503.

As the first casing 502 is moved in relation to the second casing 503, the first and the second element 529, 530 will rotate and move towards each other. When the first and the second elements 529, 530 are moved towards each other the spring element 527 will be compressed. When the first casing 502 has been moved a predetermined distance in relation to the second casing 503, the spring element 527 will press the first and the second elements 529, 530 apart and thereby also press the first casing 502 away from the second casing 503. The radio communication terminal 501 is then arranged in the open position. In the open position the spring element 527 is arranged to keep the radio communication terminal 501 in the opened position. The hinge mechanism 505 is bi-stable, i.e. the hinge mechanism 505 is arranged to keep the radio communication terminal 501 in the present position.

To again arrange the radio communication terminal 501 in the closed position, the steps are reversed.

The hinge mechanism 505 does not add to the thickness of the radio communication terminal 501, and the size of the spring element 527 is thus not that crucial to the thickness.

The principles of the present invention have been described in the abovementioned by examples of embodiments or modes of operations. However, the invention should not be construed as being limited to the particular embodiments discussed above, which are illustrative rather than restrictive, and it should be appreciated that variations may be made in those embodiments by persons skilled in the art, without departing from the scope of the present invention as defined by the appended claims.

The invention claimed is:

1. Radio communication terminal comprising a first casing, a second casing, a slider mechanism and a hinge mechanism, wherein
the slider mechanism is adapted to movably connect the first and the second casing,
the hinge mechanism is connected to the first and the second casing and adapted to move the first casing in relation to the second casing in at least a first direction between at least an open and a closed position,
the hinge mechanism is adapted to operate in a first space that is expanded when the first casing is moved in relation to the second casing, wherein
the hinge mechanism comprises a bar and a spring mechanism,
the spring mechanism is connected to the first casing,
the bar is in a first end connected to the spring mechanism and in a second end connected to the second casing,
the spring mechanism is adapted to turn the bar and thereby move the first and the second casings between the open and closed position, and wherein
the second end of the bar is slideably connected to the second casing.

2. Radio communication terminal according to claim 1, wherein
a first end of the hinge mechanism is connected to a first surface of the first casing and a second end of the hinge mechanism is connected to a first surface on the second casing and wherein said first surfaces extend in at least a second direction, and
the second direction is different than the first direction.

3. Radio communication terminal according to claim 2, wherein the second direction is substantially perpendicular to the first direction.

4. Radio communication terminal according to claim 1, further comprising at least one flexible circuit that is electronically an/or optically connected to the first and the second casing, wherein the flexible circuit is adapted to be moved in said first space.

5. Radio communication terminal according to claim 1, wherein the thickness of the radio communication terminal is less than the sum of the thickness of the first casing and the second casing.

6. Radio communication terminal according to claim 1, wherein the thickness of the hinge mechanism is smaller than the thickness of said first space.

7. Radio communication terminal according to claim 1, wherein the extension of the hinge mechanism in the thickness of the radio communication terminal is less that the extension of the first surfaces in the thickness of the radio communication terminal.

8. Radio communication terminal according to claim 1, wherein the said first space is expanded by expansion in the first direction.

9. Radio communication terminal according to claim 1, wherein said first space in two dimensions is defined by said first surfaces.

10. Radio communication terminal according to claim 1, wherein said hinge mechanism is bi-stable.

11. Radio communication terminal according to claim 1, wherein the second casing comprises a groove, the hinge mechanism further comprises a slider that is slideably arranged in the groove, and the second end of the bar is connected to the slider.

12. Radio communication terminal according to claim 1, wherein said groove is arranged in the first surface of the first casing.

13. Radio communication terminal according to claim 1, wherein the bar comprises a slit along its length, the second casing comprises a pin that is slideably arranged in said slit.

14. Radio communication terminal comprising a first casing, a second casing, a slider mechanism and a hinge mechanism, wherein
the slider mechanism is adapted to movably connect the first and the second casing,
the hinge mechanism is connected to the first and the second casing and adapted to move the first casing in relation to the second casing in at least a first direction between at least an open and a closed position, the hinge mechanism is adapted to operate in a first space that is expanded when the first casing is moved in relation to the second casing, wherein the hinge mechanism comprises a bar and a spring mechanism, the spring mechanism is connected to the first casing, the bar is in a first end connected to the spring mechanism and in a second end connected to the second casing, the spring mechanism is adapted to turn the bar and thereby move the first and the second casings between the open and closed position, and wherein the spring mechanism further comprises a cam, a cam follower and a pressure spring, the pressure spring is adapted to cooperate with the cam and the cam follower to turn the cam follower in relation to the cam.

15. Radio communication terminal comprising a first casing, a second casing, a slider mechanism and a hinge mechanism, wherein the slider mechanism is adapted to movably connect the first and the second casing, the hinge mechanism is connected to the first and the second casing and adapted to move the first casing in relation to the second casing in at least a first direction between at least an open and a closed position, and the hinge mechanism is adapted to operate in a first space that is expanded when the first casing is moved in relation to the second casing, and wherein the hinge mechanism comprises at least a first and a second bar and a spring mechanism, the spring mechanism is connected to the first casing, the first bar is in a first end connected to the spring mechanism and in a second end connected to a first end of the second bar, the second bar is in a second end turnable connected to the second casing, the spring mechanism is adapted to turn the first and the second bars and thereby move the first and the second casing between the open and closed positions.

16. Radio communication terminal according to claim 15, wherein the spring mechanism further comprises a cam, a cam follower and a pressure spring, the pressure spring is adapted to cooperate with the cam and the cam follower to turn the cam follower in relation to the cam.

17. Radio communication terminal according to claim comprising a first casing, a second casing, a slider mechanism and a hinge mechanism, wherein the slider mechanism is adapted to movably connect the first and the second casing, the hinge mechanism is connected to the first and the second casing and adapted to move the first casing in relation to the second casing in at least a first direction between at least an open and a closed position, and the hinge mechanism is adapted to operate in a first space that is expanded when the first casing is moved in relation to the second casing, wherein the hinge mechanism comprises a first and a second element and a spring mechanism comprising at least one pressure spring, the spring mechanism is connected to the first and second element and adapted to press the said elements apart, the first element is rotatable connected to the first casing, and the second element is rotatable connected to the second casing.

* * * * *

UNITED STATES PATENT AND TRADEMARK OFFICE
CERTIFICATE OF CORRECTION

PATENT NO. : 8,121,661 B2  
APPLICATION NO. : 12/396634  
DATED : February 21, 2012  
INVENTOR(S) : Daniel Kristensson et al.

Page 1 of 1

It is certified that error appears in the above-identified patent and that said Letters Patent is hereby corrected as shown below:

In the Claims  
Column 12, Claim 17, line 13, after "Radio communication terminal" -- according to claim -- should be removed.

Signed and Sealed this  
Fifth Day of August, 2014

Michelle K. Lee  
*Deputy Director of the United States Patent and Trademark Office*